(No Model.)　　　　　　　　　　　　3 Sheets—Sheet 1.
J. W. HARMON.
COMBINED SIDE DELIVERY HAY RAKE AND LOADER.
No. 522,659.　　　　　　　　Patented July 10, 1894.
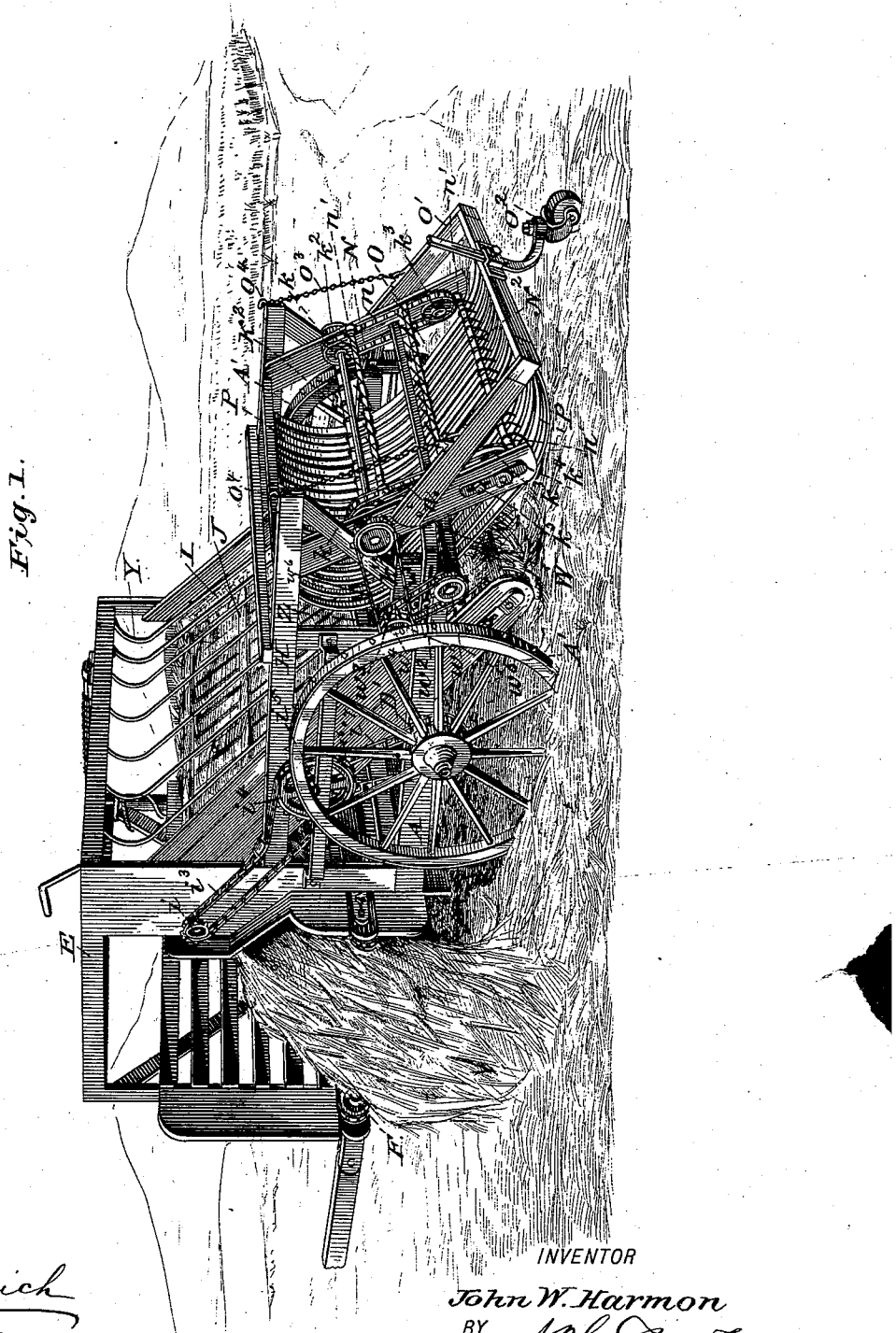
WITNESSES:
Fred G. Dieterich
Thos Rout.
INVENTOR
John W. Harmon
BY A. H. Evans &c
ATTORNEYS (No Model.) 3 Sheets—Sheet 2.
J. W. HARMON.
COMBINED SIDE DELIVERY HAY RAKE AND LOADER.
No. 522,659. Patented July 10, 1894.
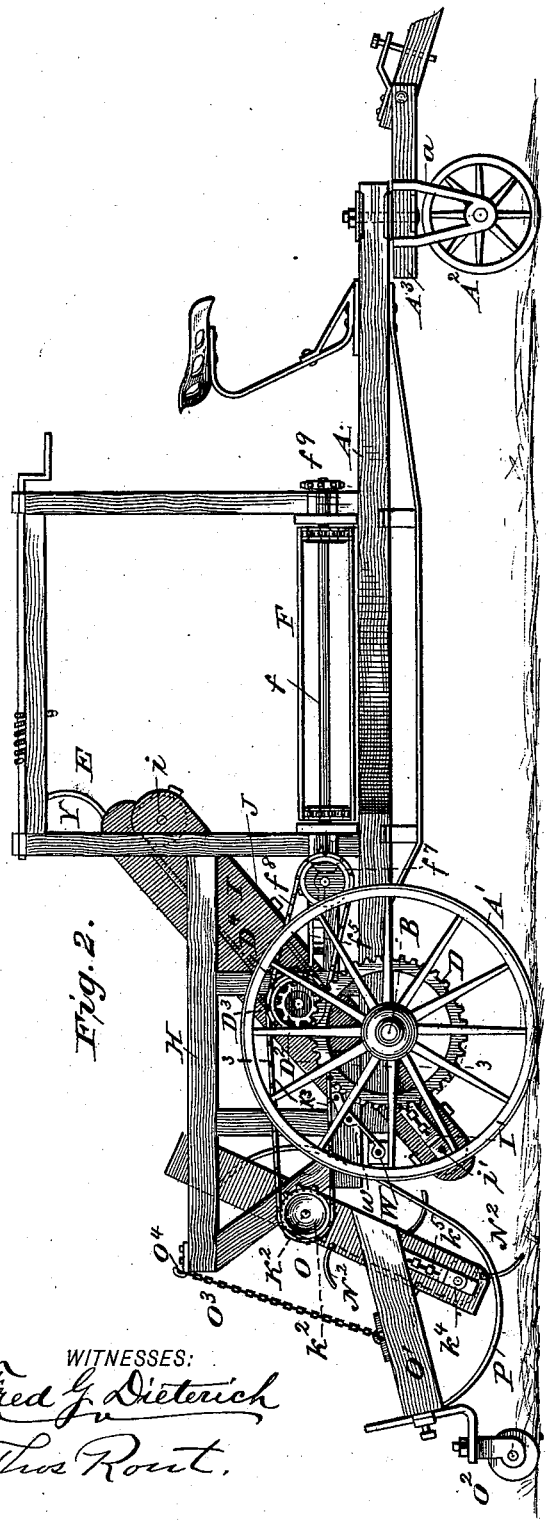
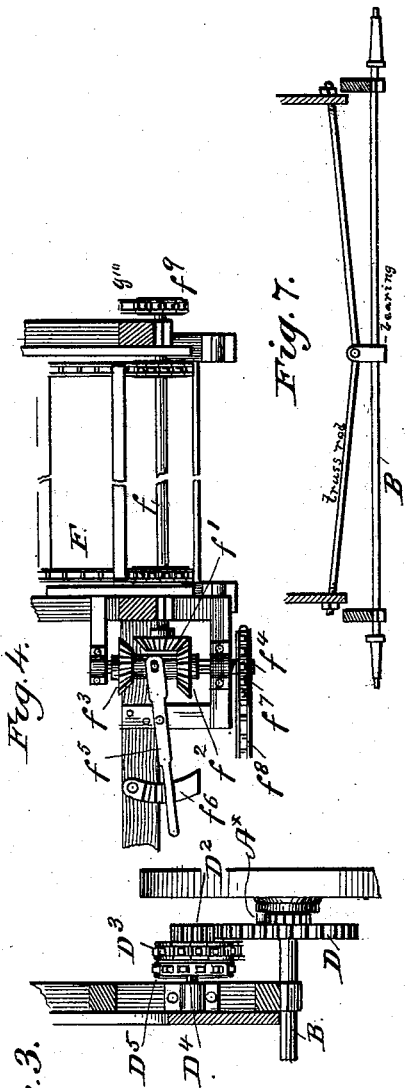
WITNESSES:
Fred G. Dieterich
Thos. Rout.
INVENTOR
John W. Harmon
BY A. H. Evans & Co
ATTORNEYS (No Model.) 3 Sheets—Sheet 3.
J. W. HARMON.
COMBINED SIDE DELIVERY HAY RAKE AND LOADER.
No. 522,659. Patented July 10, 1894.
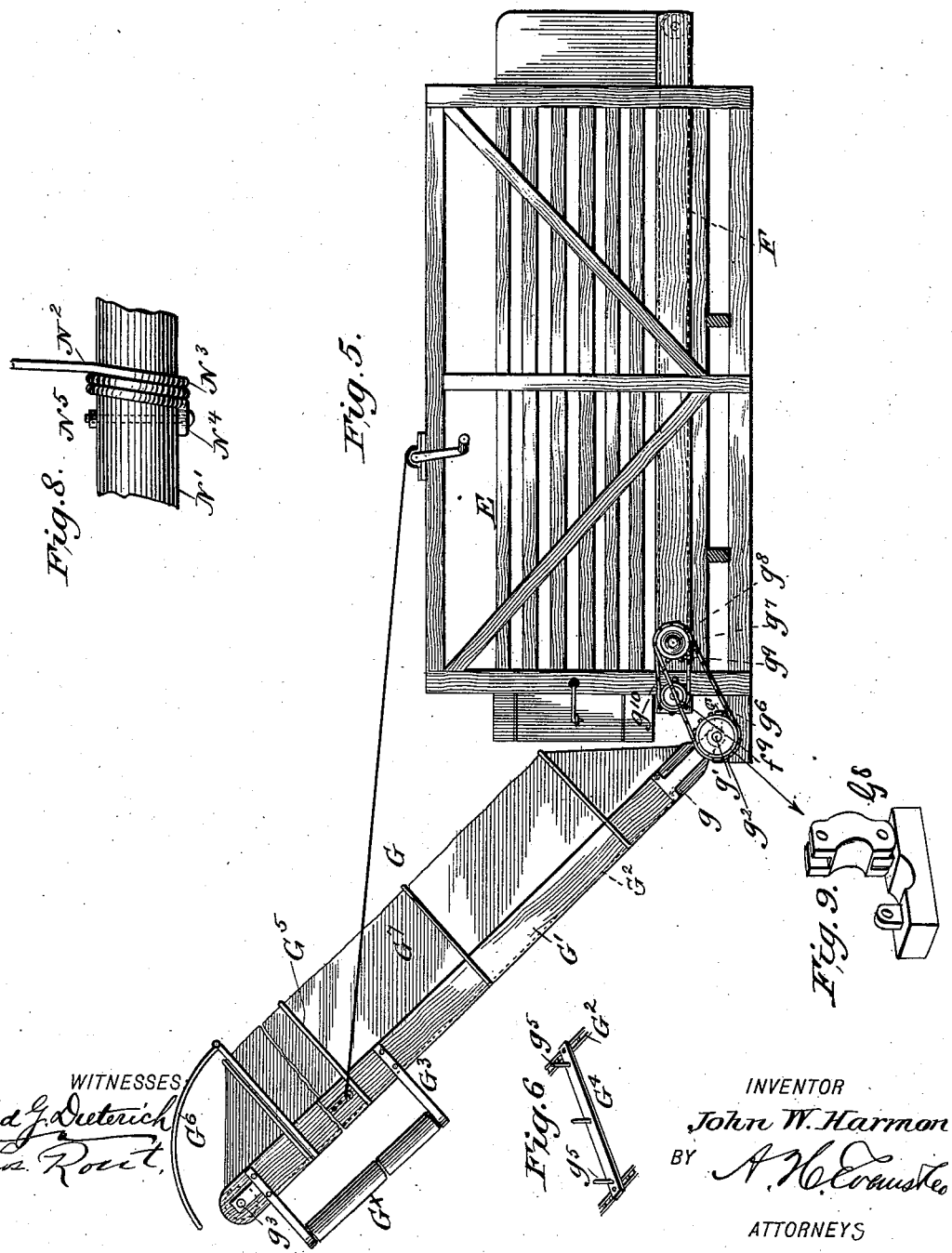
WITNESSES
Fred J. Dieterich
Thos. Rout.
INVENTOR
John W. Harmon
BY
ATTORNEYS

UNITED STATES PATENT OFFICE.

JOHN WILLIAM HARMON, OF CROMWELL, IOWA.

COMBINED SIDE-DELIVERY HAY RAKE AND LOADER.

SPECIFICATION forming part of Letters Patent No. 522,659, dated July 10, 1894.

Application filed August 31, 1893. Serial No. 484,463. (No model.)

*To all whom it may concern:*

Be it known that I, JOHN WILLIAM HARMON, a citizen of the United States, residing at Cromwell, in the county of Union and State of Iowa, have invented certain new and useful Improvements in a Combined Side-Delivery Hay Rake and Loader, as set forth in the accompanying drawings, forming a part of this specification, in which—

Figure 1, is a perspective view showing the machine operating as a side delivery rake. Fig. 2, is a side elevation of the machine as seen from the loading elevator side, the said elevator being removed. Fig. 3, is a detail section of a part of the drive mechanism taken on line 3. 3. Fig. 2. Fig. 4, is a detail plan view, of the main conveyer reversing mechanism. Fig. 5, is a partial front end view of the machine, illustrating the crib and the elevating devices connected thereto. Fig. 6, is a detail view of a part of the conveyer belt. Fig. 7, is a detail view illustrating the main axle bearings and braces. Fig. 8, is a detail view illustrating the manner of fastening the spring rake teeth to its head piece, and Fig. 9, shows one of the bearings for the lower shaft of the loading-elevator.

My invention relates to that class of machines known as combined side delivery hay rakes and loaders such as shown in my United States Patent No. 483,917, dated October 4, 1892.

The object of the invention is to provide a machine which is adapted to deliver the hay at one side to form a windrow and by a reversing mechanism cause the hay to be delivered at the opposite side to an elevator; a further object is to simplify and improve the patented construction as will appear hereinafter.

The invention will first be described and then specifically set forth in the claims.

A, represents the main frame supported at its rear end by the main or drive wheels A' mounted on the axle B and supported at its forward end by the caster or steering wheel A² mounted in hangers $a$ carried by the horizontally turning frame A³ to which the tongue is connected. The drive wheels A' are connected with the axle by the usual pawl ratchet mechanism A$^x$ Fig. 3. At one end of the axle or drive shaft B is a main or master gear wheel D and a sprocket wheel D' is secured to the opposite end of said shaft and from these two wheels the various parts of the machine are operated as will be hereinafter described.

Upon the forward portion of the main frame A is mounted the transverse crib or open frame E constructed substantially as shown in my said patent but open at both ends and provided with an endless carrier F which forms its bottom. This carrier F may be operated so as to deliver at either side of the machine as may be desired through the medium of a reversing mechanism shown in detail in Fig. 4.

When the carrier F travels to the right the hay will be delivered to the elevator G as in the said patent but when it travels to the left the hay will be delivered upon the ground in the form of a windrow as shown in Fig. 1. Therefore if the hay is sufficiently dry it may be raked and delivered to the elevator G from which it will be loaded on the wagon, but if the hay is damp or requires further curing it may be formed into windrows by reversing the movement of the carrier F and left in this condition for any desired length of time and then raked and delivered into a wagon as described.

The carrier F is mounted as usual on two parallel shafts the right hand shaft $f$, being provided at its rear end with a bevel gear $f'$ with which either one of two connected bevel gears $f^2 f^3$ is adapted to be thrown into mesh as shown in Fig. 4. These bevel gears $f^2 f^3$ are mounted to turn with and slide on a short transverse shaft $f^4$ journaled in suitable bearings in the main frame and are shifted by means of a lever $f^5$. The lever $f^5$ is locked by means of a notched rack $f^6$. The shaft $f^4$ is driven by its sprocket wheel $f^7$ through the medium of a chain $f^8$ which in turn passes around a sprocket D³ on a shaft D⁴ which shaft is provided with a pinion D² meshing with the large gear D.

The side elevator G comprises a frame G' the side bars of which at their lower ends are provided with brackets $g$, which carry the lower elevator shaft $g'$ journaled in hinged boxes G⁸ and provided with a sprocket $g^2$; a similar shaft $g^3$ being journaled in the upper end of the elevator frame and around which shafts passes the endless elevator G² provided with cross slats $G^4$ having teeth $g^5$. The sprocket $g^2$ on the lower shaft $g'$ is driven by a chain $g^6$ from a sprocket $g^7$ on a shaft $g^8$ which shaft is provided with a sprocket $g^9$ connected by a chain $g^{10}$ to the sprocket $f^9$ on the forward end of the shaft $f$ of the carrier F.

$G^\times$ are rollers in the ends of brackets or hangers $G^3$ projecting from the under side of the elevator frame at the upper end thereof, said rollers extending longitudinally of the frame so as to rest on the hay in the wagon being loaded or the stack as the case may be.

$G^7$, are side extensions for the elevator and are preferably formed of cloth secured to bars $G^5$. Over the upper end of the elevator frame extend the guard fingers $G^6$ to prevent the wind from blowing the hay away as it leaves the elevator belt.

The elevator is adjusted in the same manner as shown in the patent and further description is not thought necessary.

H, is a framework on the main frame in the rear of the crib-like frame E in which is mounted the elevator frame I provided at its opposite ends with bearings for the shafts $i$ $i'$ of the endless elevator J which is constructed in any well known manner. The shaft $i$ at its left hand end is provided with a sprocket wheel connected by a chain $i^3$ with a sprocket wheel $i^4$ mounted on a short shaft $i^5$, which shaft $i^5$ is provided with a smaller sprocket wheel $i^6$ driven by a chain $i^7$ from the sprocket D' on the axle or drive shaft B. The lower shaft $i'$ is mounted in adjustable bearings I' so as to tighten the endless elevator I.

O, is a rearwardly inclined rake frame depending from the shaft $K^2$ journaled on the rear end of the frame H to rise and fall freely, which shaft is provided along side the inner faces of the side bars of the frame O with sprocket wheels $k$ $k$ and at its outer ends with sprockets $k'$ $k^2$ respectively. Sprocket wheels $k^3$ $k^3$ are journaled in bearings formed in longitudinally slotted plates $k^4$ secured adjustably by bolts $k^5$ to the lower end of the side bars of the frame O.

O' is a yoke-like extension of the frame O to which is adjustably secured a caster wheel $O^2$.

The downward play of the frame O may be limited by a chain $O^3$ or said frame may be raised by said chain which adjustably engages a prong or hook $O^4$ on the frame H.

The endless rake N comprises chains $n$ which pass around the sprockets $k$ $k$ $k^3$ $k^3$ and cross bars or rake heads N' provided with spring teeth $N^2$ and secured at their ends in sockets $n'$ carried by the chains. The spring teeth $N^2$ are formed of wire and are coiled about the rods to form the coil springs $N^3$. The extremities of the teeth at the coiled ends are provided with eyes $N^4$ through which and the rods are passed securing bolts $N^5$. Motion is imparted to the endless rake by a chain $K^3$ extending from the sprocket $k^2$ to a sprocket $D^5$ on the shaft $D^2$.

W, is a beater like that shown in the patent referred to, but mounted in spring arms $w$ and rotated through the medium of its sprocket $w'$ and a chain $w^2$ which connects it with a sprocket $w^3$ on a shaft $w^4$ driven in turn by its sprocket $w^5$ from sprocket $k'$ through the medium of the chain $w^6$. The spring arms $w$ permit the beater W to yield and relieve the parts from too great a strain.

P, are the guard bars secured to the ends of the rake frame and constructed and arranged substantially as shown in the said patent.

Y, are the guard bars extending from a bar Z on the frame H to and across the top of the crib-like frame E as also shown in said patent.

When the machine moves forward the wheels D D' on the ends of the axle cause the rake to deliver the hay to the elevator I (over which the hay is evenly spread by the beater W) which in turn discharges the hay into the crib-like frame E upon the carrier F which will deliver it upon the ground at the left side of the machine or to the elevator G according to whether the gear $f^3$ or $f^2$ is in mesh with the gear $f'$.

The rake teeth will yield readily as now constructed and are not liable to be broken or twisted and the rake being single instead of double lessens the cost and liability of getting out of order.

I also find the single front caster-wheel to be an improvement over my former construction as are the rollers $G^\times$ over the old form of guard as will be obvious at a glance. The side frames $G^7$ give a chute-like construction to the elevator frame, and being separate and independent from the frame or crib E permit the elevator G to be removed if necessary. The guard fingers $G^6$ I also regard as an improvement over the old construction since they protect the hay at a very important point in fact where it is most exposed to the wind.

Finally I would state that the driving of the parts by separate sprocket chains affords a far more positive action than is imparted from the single chain 19 shown in the patent.

Having thus described my invention, what I claim, and desire to secure by Letters Patent of the United States, is—

1. A combined hay rake and loader comprising a frame, a reversible carrier to deliver at either end of the machine, an elevator at one end of the carrier, mechanism for reversing the movement of the carrier; and mechanism for raking and delivering the hay to said carrier, whereby the hay may be formed into windrows at one side of the machine or delivered to the elevator at the opposite side, substantially as herein described.

2. A combined hay rake and loader comprising a wheeled frame provided with a transverse open-ended crib-like frame, an endless carrier in the bottom of the crib-like frame, an elevator at one end of the carrier and a reversing mechanism for the carrier to operate it in either direction and thereby cause it to deliver to the elevator or out through the opposite open end of the crib-like frame, substantially as herein described.

3. A hay rake and loader comprising the main wheeled frame, a reversible carrier to deliver at either side of the machine, an adjustable inclined elevator at one end of the carrier and provided with longitudinally extending elongated rollers on the inner side of its upper end, and means for reversing said carrier, a rake at the rear end of the frame and an upwardly and forwardly inclined elevator for conveying the hay from the rake to the reversible carrier, substantially as herein described.

4. A combined hay rake and loader consisting in the wheeled frame, the forwardly and upwardly inclined elevator or carrier, the transverse reversible carrier upon which the first named elevator or carrier delivers, the transverse shaft journaled in the rear of and above the lower end of the inclined elevator, and provided with sprocket wheels, a freely swinging frame inclined downwardly and rearwardly from said shaft, and provided at the lower ends of its sides with sprockets, an endless rake comprising chains passing around the two sets of sprockets and cross bars or heads provided with rake teeth and a supporting wheel for said swinging frame, substantially as herein described.

5. A combined hay rake and loader comprising the wheeled main frame, the forwardly and upwardly inclined elevator, the transverse reversible carrier adapted to deliver at either side of the frame, and upon which said elevator discharges, a shaft journaled in the rear of and above the lower end of said elevator, and provided with sprockets, a freely swinging frame inclined downwardly and rearwardly from said shaft, sprockets journaled in adjustable bearings on the lower ends of the sides of said frame, an endless rake having chains which pass around the two sets of sprockets, flexible adjustable connections between the rear end of the main frame and said swinging frame to limit the downward movement thereof, and a vertically adjustable caster wheel mounted on a rearward extension of said swinging frame, substantially as herein described.

6. The combination with the main wheeled frame, a reversible carrier to deliver at either side of the machine, an elevator at one end of the carrier and mechanism for reversing the movement of the carrier, of a rake at the rear end of the frame, an upwardly and forwardly inclined elevator for conveying the hay from the rake to said reversible carrier, and a spring supported beater crossing the lower portion of said elevator, substantially as herein described.

7. The combination with the main wheeled frame provided with a raking mechanism, and an endless inclined elevator receiving the hay from the rake, of a transverse horizontal crib-like frame into which said elevator delivers, shafts or drums journaled in the bottom of the frame at both ends thereof, a reversible endless carrier extending around said drums or shafts, and forming the traveling bottom of said crib-like frame, mechanism for reversing the movement of the said carrier and a loading elevator mounted removably at one end of said carrier, substantially as herein described.

8. The combination with the reversible transverse carrier to deliver at either side of the machine, and mechanism for raking and delivering the hay to said carrier, of the loading elevator mounted removably at its lower end in bearings at one end of said reversible carrier; the frame of the loading elevator being provided with sides disconnected at their lower ends from the frame of the machine, and means for adjusting the inclination of said loading elevator, substantially as herein described.

9. The combination with the wheeled frame the axle of which is provided at its ends with main or master gears, the inclined longitudinal endless carrier the upper shaft of which is geared by chains and intermediate sprockets to one of said main gears, the transverse reversible carrier geared to the other one of said main gears, and having a reversing mechanism for changing its direction of travel, an endless rake geared to the latter main gear, a beater geared to the rake operating shaft, an endless side elevator at one end of the transverse carrier and geared to its operating shaft, substantially as herein described.

JOHN WILLIAM HARMON.

Witnesses:
  B. W. PERRY,
  F. F. CULVER.